United States Patent
Noonan et al.

(10) Patent No.: US 10,309,090 B2
(45) Date of Patent: *Jun. 4, 2019

(54) RING GRIT REMOVER

(71) Applicant: Smith & Loveless Inc., Lenexa, KS (US)

(72) Inventors: Francis M. Noonan, Osawatomie, KS (US); Dale White, Gardner, KS (US); Rodney S. Mrkvicka, Leawood, KS (US)

(73) Assignee: Smith & Loveless Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,516

(22) Filed: Jan. 31, 2018

(65) Prior Publication Data

US 2018/0148918 A1    May 31, 2018

Related U.S. Application Data

(63) Continuation of application No. 14/823,488, filed on Aug. 11, 2015.

(60) Provisional application No. 62/035,594, filed on Aug. 11, 2014.

(51) Int. Cl.
| | | |
|---|---|---|
| *C02F 1/38* | (2006.01) | |
| *E03F 5/14* | (2006.01) | |
| *B01D 21/00* | (2006.01) | |
| *B01D 21/24* | (2006.01) | |
| *B01D 21/26* | (2006.01) | |

(52) U.S. Cl.
CPC ............ *E03F 5/14* (2013.01); *B01D 21/0036* (2013.01); *B01D 21/0054* (2013.01); *B01D 21/245* (2013.01); *B01D 21/2411* (2013.01); *B01D 21/2444* (2013.01); *B01D 21/267* (2013.01); *C02F 1/38* (2013.01); *C02F 2303/24* (2013.01)

(58) Field of Classification Search
CPC .......... E03F 5/14; C02F 1/38; C02F 2303/24; B01D 21/2411; B01D 21/2444; B01D 21/267

See application file for complete search history.

(56) References Cited

U.S. PATENT DOCUMENTS

| | | | |
|---|---|---|---|
| 3,258,123 | A | 6/1966 | Fontaine |
| 3,941,698 | A | 3/1976 | Weis |
| 3,965,013 | A | 6/1976 | Jackson |

(Continued)

FOREIGN PATENT DOCUMENTS

EP          2105204 A1      9/2009

OTHER PUBLICATIONS

International Search Report and Written Opinion dated Feb. 19, 2016.

*Primary Examiner* — David C Mellon
(74) *Attorney, Agent, or Firm* — Wood, Phillips, Katz, Clark & Mortimer

(57) ABSTRACT

A grit removal unit for a wastewater system including a grit removal chamber with a substantially annular vertical wall. A horizontal annular ring above the chamber bottom extends inwardly from the annular vertical wall, with an influent channel extending into the chamber beneath the ring and an effluent channel above the rim and extending out of the chamber. The influent and effluent channels both have inner side walls with a curved portion, with both curved portions extending through an arc of at least 90 degrees within the chamber annular vertical wall.

10 Claims, 6 Drawing Sheets

(56) References Cited

U.S. PATENT DOCUMENTS

| | | |
|---|---|---|
| 4,107,038 A | 8/1978 | Weis |
| 4,519,907 A | 5/1985 | Rooney |
| 4,767,532 A | 8/1988 | Weis |
| 6,811,697 B2 | 11/2004 | Davis et al. |
| 6,881,350 B2 | 4/2005 | Wilson |
| 8,906,233 B2 | 12/2014 | Messick et al. |
| 2003/0085164 A1 | 5/2003 | Davis et al. |
| 2008/0105604 A1 | 5/2008 | Weis et al. |
| 2011/0240568 A1 | 10/2011 | Beliveau |
| 2013/0270169 A1 | 10/2013 | Messick et al. |
| 2014/0124436 A1 | 5/2014 | Noonan et al. |

RING GRIT REMOVER

CROSS-REFERENCE TO RELATED APPLICATIONS

This application claims the benefit of the filing date of U.S. Provisional Application Ser. No. 62/035,594, filed Aug. 11, 2014 and U.S. Ser. No. 14/823,488, filed Aug. 11, 2015, which are hereby incorporated by reference in their entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to a grit selector or trap for selectively removing sand and grit from a flowing stream of fluid.

BACKGROUND OF THE INVENTION

Grit is one of the most unpredictable and difficult materials a sewage treatment plant must handle. Grit can be defined as the heavy mineral matter present in sewage. It is principally made up of sand, gravel, and inorganic material which reaches a sewage disposal plant. It is desirous to remove this material as it cannot be treated, reduced in size, or eliminated by biological treatment methods. It presents a problem to waste treatment as it is hard and abrasive. It wears pumps and other mechanical devices. It is heavy and accumulates in clarifiers, treatment basins, digesters, etc., where it must sometimes be removed by manually.

Grit removal devices of various designs have been proposed to remove grit from a flowing stream of water. Several such devices are shown, for example, in U.S. Pat. Nos. 3,941,698, 4,107,038, 4,519,907, 6,811,697, 6,881,350, and 8,906,233.

U.S. Pat. No. 3,941,698 includes an upper settling chamber and a lower grit storage chamber. The settling chamber, being of large diameter, communicates with the storage chamber through a relatively small opening in a substantially flat transition surface therebetween. Rotating paddles positioned within the settling chamber, a short distance above the transition surface, can enhance the natural rotational flow of liquid entering the settling chamber adjacent the outer periphery to rotate about the chamber as a forced vortex resulting in an upward spiral flow which urges the settled particles across the transition surface towards the opening. The heavier settled particles fall through the opening into the storage chamber and the lighter organic particles rise in the spiral flow. The contents in the storage chamber are lightly air scoured prior to removal to cause any organics therein to be lifted out of the storage chamber and returned to the settling chamber.

A similar type of grit removal device is disclosed in U.S. Pat. No. 4,107,038, in which a ramp is in communication with the flume portion of the inlet trough to cause grit to follow the ramp down towards the transition surface. A baffle is also positioned in the settling chamber against which the rotating liquid impinges to deflect the liquid downwardly into a generally toroidal flow pattern that spirals around the periphery of the settling chamber. The toroidal motion of the liquid moves the grit on the transition surface towards the center opening.

The above-described prior art devices operate on the forced vortex principle. In these devices the head at the periphery of the settling chamber is higher than at the center of the settling chamber. This causes liquid to flow down the wall of the settling chamber to the bottom thereof and across the bottom to the point of lower head at the center thereof. It is this transverse circulatory flow pattern which permits the device to work. The particulate matter in suspension must follow this path to reach the bottom of the settling chamber and be carried to the center of the transition surface to the storage chamber. This takes some time and some of the particulate matter may not travel the full circuit before it is caught in the flow passing out the effluent, which results in a lowering of grit removal efficiency.

In still other grit removal devices such as shown in U.S. Pat. Nos. 4,767,532, 6,811,697, and 8,906,233 flow toward the center of a chamber is facilitated by a rotating propeller or paddle. U.S. Pat. No. 8,906,233 also includes a ring around the interior periphery of the settling chamber blocking fluid flowing around the outside of the chamber from rising up to the level of the chamber outlet.

Grit removal devices as described above, whether operating by settling or vortex action, require a relatively large footprint, presenting space problems in designing overall treatment facilities in which the grit removal devices are only a part. Of course, larger devices are inherently more costly, and can use more energy. Further, such devices are not as well adapted as might be desired to operate efficiently in environments in which the flow rate varies widely. Still further, the ability of the devices to efficiently remove grit can always be improved.

The present invention is directed toward, inter alia, one or more of the problems set forth above.

SUMMARY OF THE INVENTION

In one aspect of the present invention, a grit removal unit for a wastewater system is provided, including a round grit removal chamber defined by a bottom surface and a substantially annular vertical wall extending up from the bottom surface, a substantially horizontal annular ring spaced above the chamber bottom surface and extending inwardly from the chamber annular vertical wall to an inner edge, and an enclosed influent channel extending into the chamber beneath the ring. The influent channel has an outer side wall with a planar portion tangent to the chamber vertical wall and an inner side wall with a planar portion and a curved portion extending through an arc of at least about 90 degrees within the chamber annular vertical wall.

In one form of this aspect of the invention, the inner side wall is a J-shaped baffle having a leg with a curved portion extending at least 90 degrees and concentric with the chamber annular vertical wall, the curved portion secured around the inner diameter of the ring. In an alternate form, the inner side wall curved portion spirals from a proximate end adjacent the baffle leg to a distal end spaced from the baffle leg, the spiral having a radius at the distal end which is less than the radius at the proximate end.

In another form of this aspect of the invention, the enclosed influent channel inner side wall curved portion extends through an arc of between about 90 degrees to about 270 degrees within the chamber annular wall.

In another aspect of the present invention, a grit removal unit for a wastewater system is provided, including a round grit removal chamber defined by a bottom surface and a substantially annular vertical wall extending up from the bottom surface, a substantially horizontal annular ring spaced above the chamber bottom surface and extending inwardly from the chamber annular vertical wall to an inner edge, an enclosed influent channel extending into the chamber beneath the ring, and an effluent channel above the rim and extending out of the chamber. The influent channel has an outer side wall with a planar portion tangent to the chamber vertical wall and an inner side wall with a planar portion and a curved portion extending through an arc of at least 90 degrees within the chamber annular vertical wall. The effluent channel has an outer side wall with a planar portion tangent to the chamber vertical wall and an inner side wall with a planar portion and a curved portion extending through an arc of at least 90 degrees within the chamber annular vertical wall.

In one form of this aspect of the invention, the influent channel has an outlet substantially aligned with an inlet to the effluent channel so as to substantially prevent influent from the influent channel outlet from exiting to the effluent channel input without first entirely circling the chamber.

In another form of this aspect of the invention, the influent channel outlet is substantially aligned with and below the effluent channel inlet.

In still another form of this aspect of the invention, the enclosed influent channel inner side wall curved portion and the effluent channel inner side wall both extend through an arc of between about 90 degrees to about 270 degrees within the chamber annular wall.

In yet another form of this aspect of the invention, the enclosed influent channel inner side wall curved portion and the effluent channel inner side wall curved portion both extend through an arc of about 180 degrees.

In another form of this aspect of the invention, the radially inner sides of the influent and effluent channels are defined by J-shaped baffles with curved portions substantially concentric with the chamber annular vertical wall.

In still another form of this aspect of the invention, the inner side wall curved portion spirals from a proximate end adjacent the baffle leg to a distal end spaced from the baffle leg. In a further form, the spiral has a radius at the distal end which is less than the radius at the proximate end.

In still another aspect of the present invention, a grit removal unit for a wastewater system is provided, including a round grit removal chamber defined by a bottom surface and a substantially annular vertical wall extending up from the bottom surface, a substantially horizontal annular ring extending inwardly from the chamber annular vertical wall to an inner edge having a radius $R_i$, the ring being spaced above the chamber bottom surface, an influent channel through an opening in the chamber vertical wall beneath the ring, and an effluent channel through an opening in the chamber vertical wall above the ring. The influent channel has one influent side wall substantially tangential to the chamber vertical wall at the influent channel opening in the chamber vertical wall, and a influent inner side wall having a substantially flat portion parallel to the one influent side wall and a curved portion extending between the chamber bottom surface and the ring, the influent inner side wall curved portion having a radius $R_i$ and extending through an arc of at least 90 degrees, the influent channel having its outlet at the end of the influent inner side wall curved portion. The effluent channel has one effluent side wall substantially tangential to the chamber vertical wall at the effluent channel opening in the chamber vertical wall, and an effluent inner side wall having a substantially flat portion parallel to the one effluent side wall and a curved portion extending upwardly from the ring, the effluent inner side wall curved portion having a radius $R_i$ and extending through an arc of at least 90 degrees, the effluent channel having its inlet at the end of the effluent inner side wall curved portion.

In one form of this aspect of the invention, the influent channel outlet and the effluent channel inlet are aligned so as to substantially prevent influent from the influent channel from exiting to the effluent channel input without first entirely circling the chamber.

In another form of this aspect of the invention, the end of the influent inner side wall curved portion is substantially aligned with and below the end of the effluent inner side wall curved portion.

In still another form of this aspect of the invention, the influent inner side wall curved portion and the effluent inner side wall curved portion both extend through an arc of between about 90 degrees and about 270 degrees within the chamber annular wall.

In yet another form of this aspect of the invention, the inner side wall is a J-shaped baffle having a leg with a curved portion extending through an angle at least 90 degrees and concentric with the chamber annular vertical wall, the curved portion secured around the inner diameter of the ring. In a further form, the inner side wall curved portion spirals from a proximate end adjacent the baffle leg to a distal end spaced from the baffle leg, the spiral having a radius at the distal end which is less than the radius at the proximate end.

In still another aspect of the present invention, a grit removal unit for a wastewater system is provided, including a round grit removal chamber defined by a bottom surface and a vertical wall substantially annular vertical wall about a center and extending up from the bottom surface, a substantially horizontal annular ring extending inwardly a radial distance $R_d$ from the chamber annular vertical wall, the ring being above the chamber bottom surface, an influent channel through an opening in the chamber vertical wall and beneath the ring, and an effluent channel through an opening in the chamber vertical wall and above the ring. The chamber vertical wall has a radius of $R_{VW}$ around a chamber center. The influent channel has one influent side wall substantially tangential to the chamber vertical wall at the influent channel opening in the chamber vertical wall, a second influent side wall substantially parallel to the one influent side wall and spaced from the one influent side wall by the distance $R_d$, and a curved extension of the second influent side wall within the chamber, where the curved extension has a radius of $R_{ex}$ and $R_{ex}=R_{VW}-R_d$. The second influent side wall and curved extension extend from the chamber bottom surface to the ring so that the influent channel is defined between the first and second influent side walls, the curved extension, the ring, and the chamber bottom surface. The effluent channel has one effluent side wall substantially tangential to the chamber vertical wall at the effluent channel opening in the chamber vertical wall, a second effluent side wall substantially parallel to the one effluent side wall, and a curved extension of the second effluent side wall within the chamber. The effluent curved extension has a radius of $R_{ex}$, wherein the second effluent side wall and curved extension extend upwardly from the ring so that the effluent channel is defined above the ring between the first and second effluent side walls and the curved extension. The curved extensions of the influent and effluent channel second side walls extend through an arc of at least about 90 degrees around the center.

In one form of this aspect of the present invention, the output from the influent channel and the input to the effluent channel are aligned so as to substantially prevent influent from the influent channel from exiting directly to the effluent channel input without first substantially entirely circling the chamber.

In another form of this aspect of the invention, the end of the curved extension of the second influent side wall is substantially aligned with the end of the curved extension of the second effluent side wall.

In still another form of this aspect of the invention, the influent curved extension and the effluent curved extension both extend through an arc of about 90 degrees to about 270 degrees around the chamber center and within the chamber annular wall.

Other objects, features, and advantages of the invention will become apparent from a review of the entire specification, including the appended claims and drawings.

DETAILED DESCRIPTION OF THE PREFERRED EMBODIMENT

Figure 1:
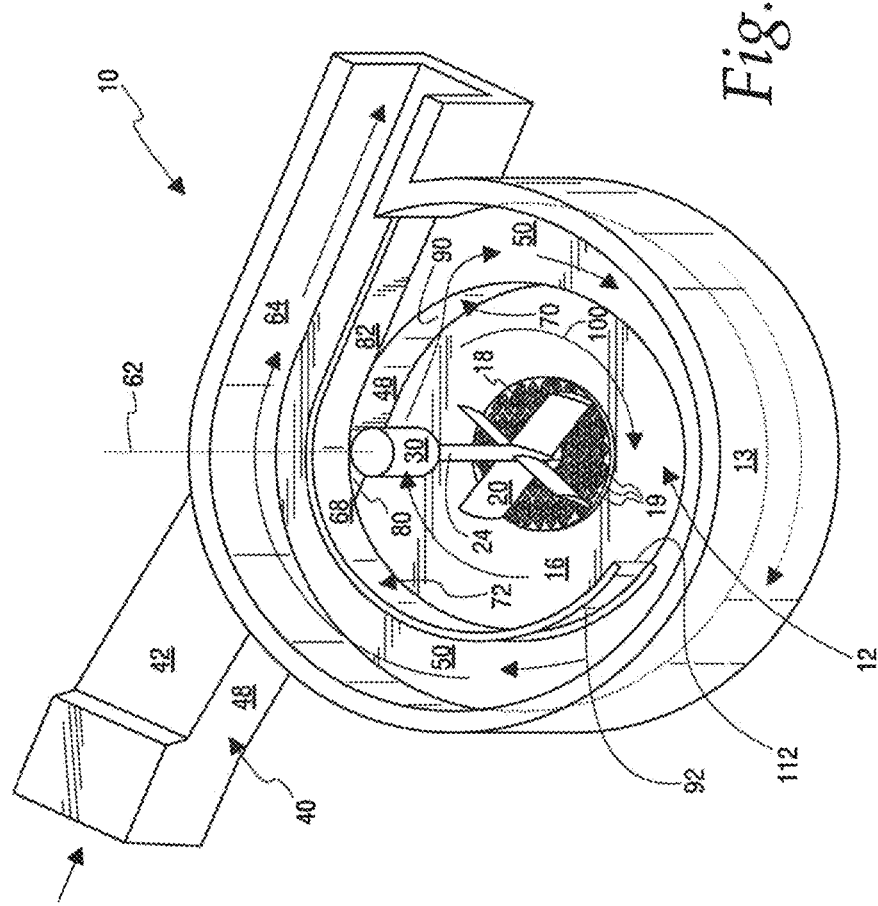
FIG. 1 is a perspective view of a grit removal apparatus having at least one of the advantageous new features of the present invention.

The Figures show an apparatus 10 for separating grit from incoming liquid sewage (influent) in accordance with the present invention. A circular cylindrical separation chamber or basin 12 having an annular vertical side wall 13 is disposed immediately above and concentric with a cylindrical grit storage chamber 14 (see FIG. 2) of a lesser diameter.

A substantially flat transition bottom surface or floor 16 including a removable plate 18 centered in the separation chamber 12 separates the storage and separation chambers 14, 12. Suitable openings 19 through the plate 18 permit communication between the chambers 12, 14.

A multi-bladed propeller 20 may be mounted on a cylindrical shaft 24 for rotation, with the upper portion of the shaft 24 connected, for example, to a suitable drive 30 for rotating the propeller 20. Such configurations are shown, for example, in U.S. Pat. Nos. 4,107,038, 4,767,532 and 8,906,233, the disclosures of which are hereby incorporated by reference. Still other propeller and storage chamber constructions may also be used within the scope of some aspects of the present invention as described herein.

An influent channel or inlet trough 40 has a covered downwardly extending influent flume portion 42 to introduce an influent liquid stream directly into a lower portion (i.e., the bottom) of the separation chamber 12 through an opening at the bottom of the separation chamber annular side wall 13. The flume portion 42 includes a ramp at its bottom which may be advantageously sloped at, for example, about 20 degrees, with the ramp and the ceiling of the flume portion 42 being substantially parallel.

The influent channel 40 also has an outer side wall 46 which is substantially tangential to the separation chamber annular side wall 13 on one side of the bottom chamber opening and an inner side wall or baffle 48 described in greater detail hereafter.

An annular, ring-shaped flange or ring 50 is secured or married around the separation chamber annular side wall 13 at a height above the chamber floor 16 which is substantially equal to the vertical height at the bottom end of the flume portion 42 and the vertical height of the bottom of an effluent channel or outlet trough 60 through an opening at the top of the separation chamber annular side wall 13. The ring 50 thus has an outer diameter equal to the radius of the vertical wall of the separation chamber 12 ($R_{vw}$) and a radial dimension ($R_d$), and an inner edge having an inner radius ($R_i$), where $R_{vw} - R_d = R_i$. The ring 50 may advantageously extend around the entirety of the separation chamber 12, although it should be appreciated that a ring 50 of less than 360 degrees could also be advantageously used in some aspects of the present invention.

It should be noted that the annular components as described herein are curved around a center 62 which is generally aligned with the cylindrical shaft 24 of the propeller 20.

The effluent channel 60 allows fluid to flow out of the separation chamber 12 through an opening at the top of the separation chamber annular side wall 13. The effluent channel 60 also has an outer side wall 64 which is substantially tangential to the separation chamber annular side wall 13 on one side of the top chamber opening and an inner side wall or baffle 68 described in greater detail hereafter.

Specifically, the inner side walls 48, 68 may be advantageously defined by bottom and top J-shaped vertical baffles 70, 72 secured to the ring 50, wherein each includes a straight portion 80, 82 and a curved portion 90, 92, wherein the curved portion 90, 92 may advantageously be secured to the inner edge of the ring 50. In one aspect of the present invention, the straight portions 80, 82 are substantially parallel to the respective outer side walls 46, 64, spaced therefrom by a distance of about $R_d$. The curved portions 90, 92 may be substantially concentric with the cylindrical separation chamber outer wall 13, with a diameter less than the chamber outer wall 13 of about $R_d$.

It should be understood, however, that the curved portions 90, 92 may alternatively not be substantially concentric with the cylindrical separation chamber outer wall 13, with the radius at a given point on an arc ($R_A$) being a function of the arcuate position (θ) at that point, or $R_A = f(θ)$. For example, the curve of the curved portions 90, 92 could spiral in the direction of flow with the radius of curvature decreasing in the direction of flow.

The bottom J-shaped baffle 70 extends up from the chamber floor 16 to the ring 50, so that the influent channel 40 is enclosed on top and bottom by the ring 50 and floor 16 and on opposite sides by the outer side wall 46 and inner side wall (baffle) 48. The top J-shaped baffle 72 extends up from the ring 50, so that the effluent channel 60 is on top of the ring 50 and between the chamber outer side wall 46 and inner side wall (baffle) 68.

Advantageously the curved portions 90, 92 of the J-shaped baffles 70, 72 extend through an arc of at least about 90 degrees and up to about 270 degrees (i.e., plus or minus 10 degrees).

It should be appreciated that extending the bottom baffle 70 through an arc inside the separation chamber 12 will ensure that the influent will all flow through at least that arc without exiting into the chamber 12, and without entering the effluent channel 60. Moreover, when the curved portion 90 of the bottom J-shaped baffle 70 extends through an arc of, for example, 180 degrees, it should be recognized that as flow of that influent continues around the chamber 12, it will after exiting the influent channel 40 continue around 180 degrees inside of the bottom J-shaped baffle 70 (see arrow 100 in FIGS. 1 and 3), plus an arc in which the inner radius transitions with the baffle straight portion 80. Thus the grit within the fluid will be forced toward the center and the storage chamber 14, with the maximum radial distance for the grit to travel to the storage chamber 14 reduced by $R_d$ (i.e., from inside the J-shaped baffle 70 rather than from the storage chamber outer wall).

Figure 2:
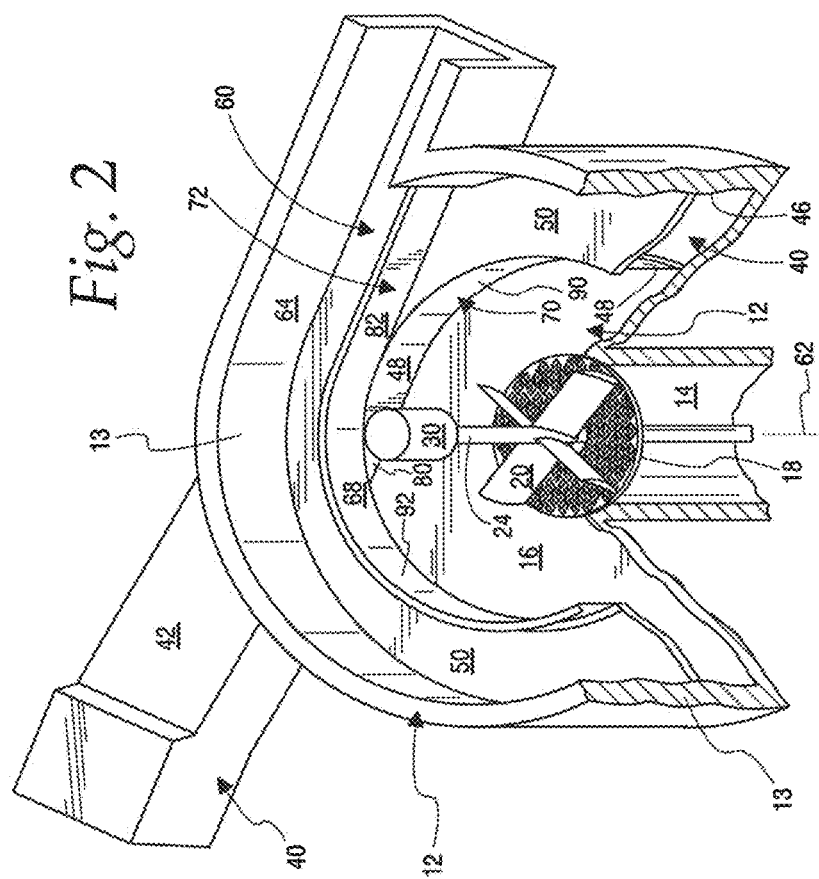
FIG. 2 is a partial cut away view of the apparatus of FIG. 1.
Figure 3:
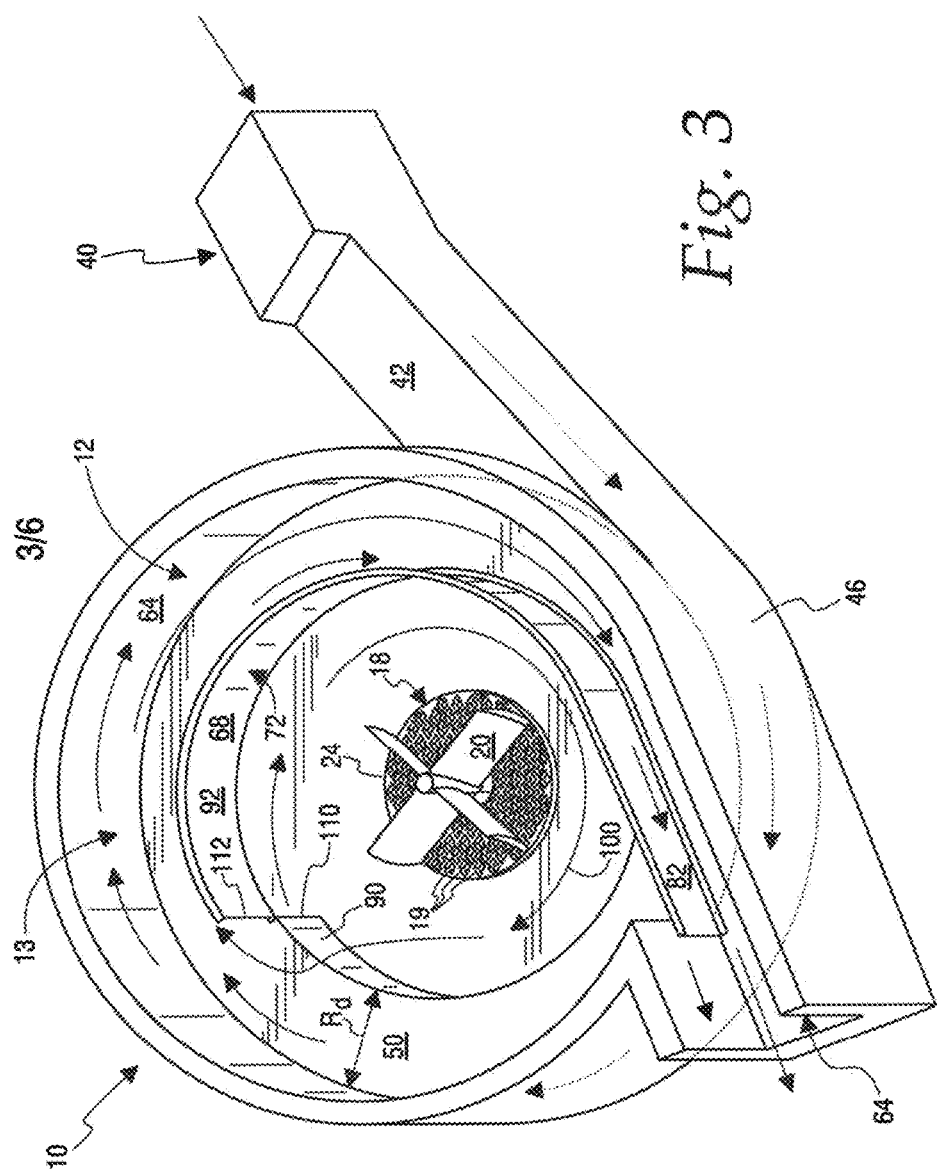
FIG. 3 is a second perspective view of the apparatus of FIG. 1.
Figure 4:
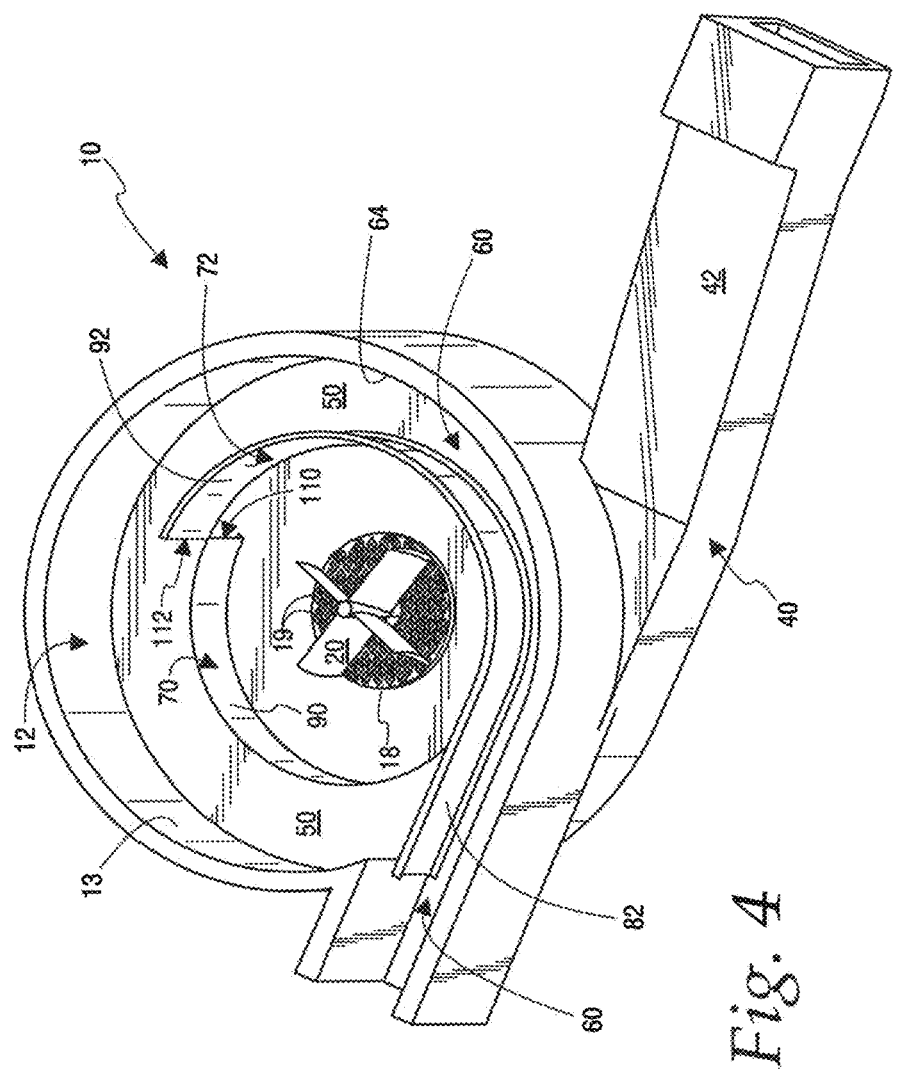
FIG. 4 is a third perspective view of the apparatus of FIG. 1.
Figure 5:
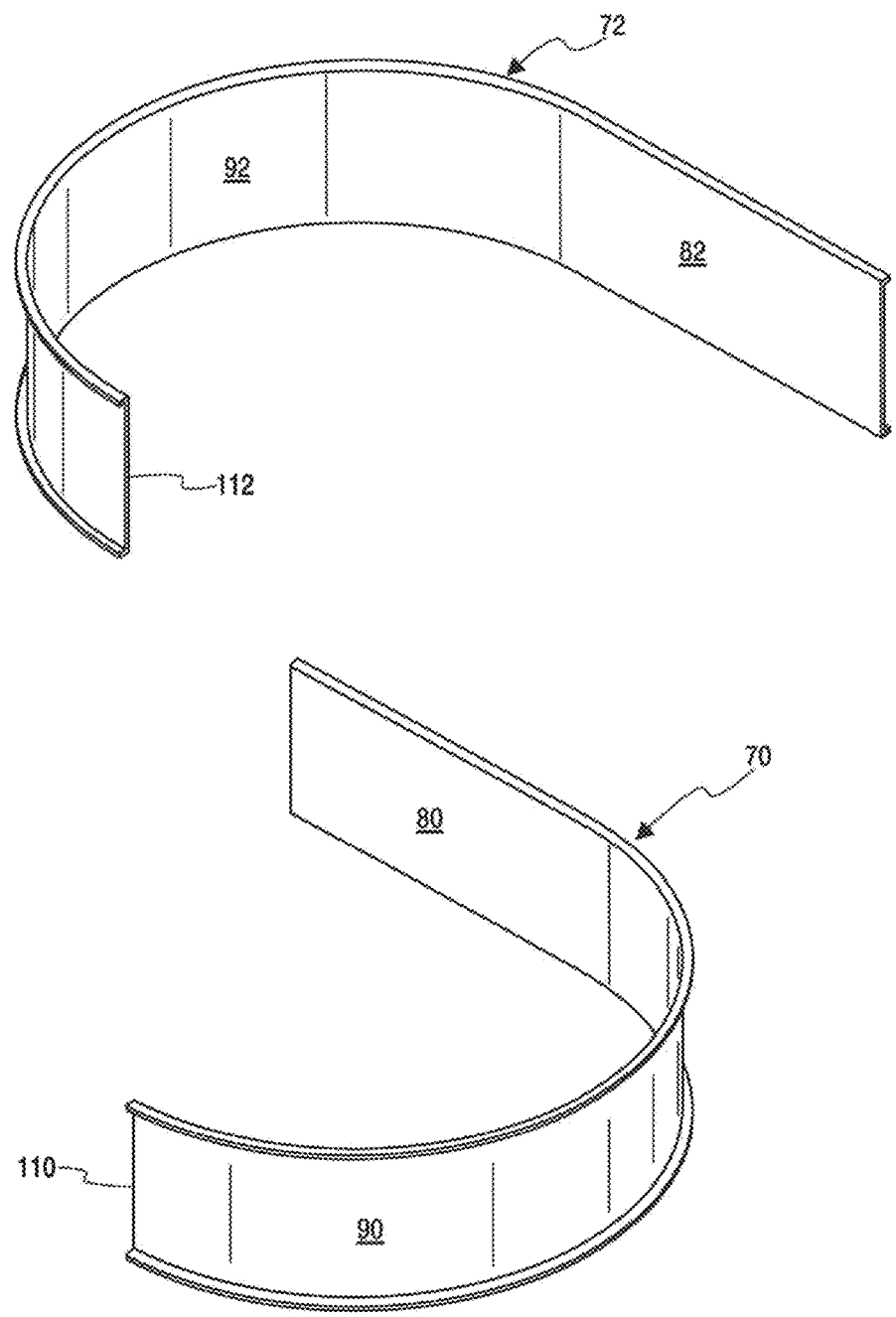
FIG. 5 is a perspective view of baffles which may advantageously define the inner walls of the influent and influent channels according to the present invention.

It should also be appreciated that the combination of both J-shaped baffles 70, 72 with the ring 50 can further ensure that fluid entering the separation chamber 12 will travel around the chamber 12 at least once to provide efficient separation. This is particularly so in configurations in which the baffle curved portions 90, 92 extend far enough so that their ends 110, 112 distal from the straight portions 80, 82 are substantially aligned or overlap such as best illustrated in FIGS. 2 and 3 (e.g., the exit from the influent channel 40 may advantageously be beneath or beyond the entrance to the effluent channel 60. It should be appreciated that the exit from the influent channel 40 into the separation chamber 12 is substantially aligned beneath the effluent channel 60 such that any influent would have to flow essentially at least 360 degrees around the chamber before being able to enter the effluent channel 60.

Figure 7:
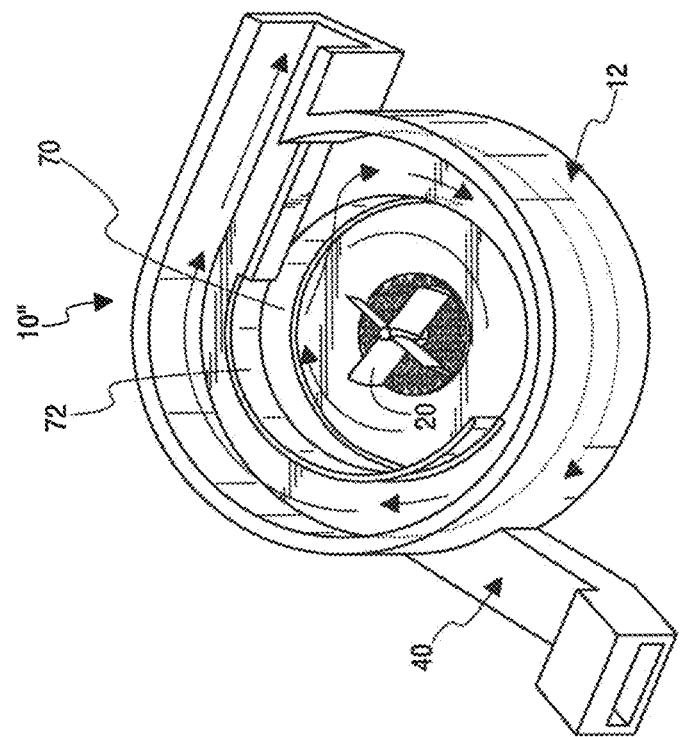
FIGS. 6 and 7 are perspective views of grit removal apparatuses having different orientations of the influent and effluent channels than the orientation of the FIGS. 1-4.
Figure 6:
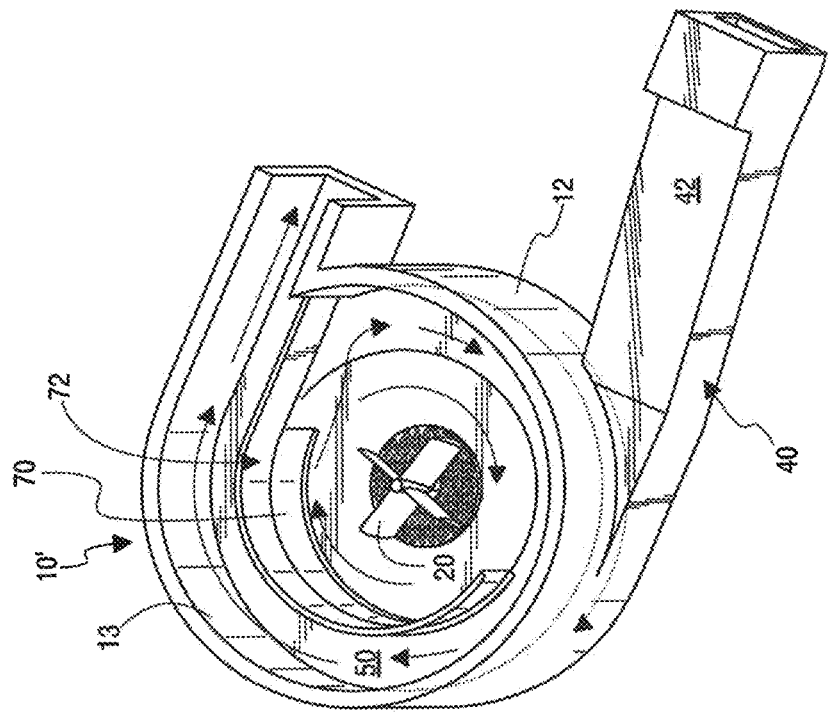

It should be understood also that the straight portions 80, 82 could be oriented in different relative positions than illustrated in FIGS. 1-3 (wherein they are substantially in line with one another). For example, baffle(s) according to at least one aspect of the present invention could be used if the environment of the apparatus 10' requires that the effluent flow back in the direction from which the influent came as shown in FIG. 6, or the apparatus 10" requires influent and effluent flow at right angles as shown in FIG. 7. As with the FIGS. 1-4 embodiment, the ends of the baffles could also be aligned, or overlap, or fall short of each other (i.e., the exit from the influent channel 40 could end beneath the ring 50 before the entrance to the effluent channel 60 above the ring 50, where the ring 50 is sufficient to block flow from occurring straight from the influent channel outlet into the effluent channel inlet), depending on the choice of arc from 90 to 270 degrees of the baffle curved portions 90, 92. In such configurations the baffle(s) may similarly advantageously improve efficiency by reducing the maximum radial distance grit may be required to be separated into the storage chamber 14, and may further advantageously assist in preventing any influent from immediately and undesirably entering the effluent channel 60 without flowing around entirely around the inside of the chamber at least once.

Still other aspects and advantages of the present invention may be obtained from a study of the disclosure herein.

The invention claimed is:

1. A grit removal unit for a wastewater system, comprising:
   a round grit removal chamber defined by a substantially horizontal bottom surface and a substantially annular vertical wall extending up from said bottom surface, said grit removal chamber including a bottom opening through said substantially annular vertical wall;
   a substantially horizontal annular ring spaced above said chamber bottom surface and extending inwardly from the chamber substantially annular vertical wall to an inner edge, said ring extending around the entirety of the chamber substantially annular vertical wall; and
   an enclosed influent channel extending into said chamber beneath the ring and through said bottom chamber opening, said influent channel having an outer side wall with a planar portion tangent to said chamber substantially annular vertical wall and an inner side wall with a planar portion and a curved portion extending to an end spaced from said planar portion through an arc of at least about 90 degrees within said chamber substantially annular vertical wall, said curved portion end being at the end of said arc, wherein said inner side wall curved portion extends downwardly from the inner edge of the ring to the chamber bottom surface;
   wherein said influent channel is enclosed continuously from said grit removal chamber bottom opening to said inner side wall curved portion end by said grit removal chamber bottom surface on its bottom, by said ring on its top, by said outer side wall on its outer side, and by said inner side wall on its inner side, with said influent channel opening to said grit removal chamber at said inner side wall curved portion end.

2. The grit removal unit of claim 1, wherein said inner side wall is a J-shaped baffle having a leg defining said influent inner side wall planar portion and a curved portion defining said influent inner side wall curved portion and extending at least about 90 degrees and concentric with said chamber substantially annular vertical wall, with said J-shaped baffle curved portion secured to the inner edge of said ring.

3. The grit removal unit of claim 2, wherein said J-shaped baffle curved portion spirals from a proximate end adjacent said J-shaped baffle leg to a distal end spaced from said J-shaped baffle leg, said spiral of said J-shaped baffle curved portion having a radius at said distal end which is less than the radius at the proximate end.

4. The grit removal unit of claim 1, wherein said enclosed influent channel inner side wall curved portion extends through an arc of between about 90 degrees to about 270 degrees within the chamber substantially annular vertical wall.

5. The grit removal unit of claim 1, further comprising an effluent opening through said chamber substantially annular vertical wall and above said ring, wherein said inner side wall has an end and said influent channel has an outlet at the end of said inner side wall and located sufficiently around said removal chamber to substantially prevent influent from said influent channel outlet exiting to said effluent channel opening without first entirely circling said chamber.

6. A grit removal unit for a wastewater system, comprising:
   a round grit removal chamber defined by a substantially horizontal bottom surface and a substantially annular vertical wall extending up from said bottom surface;
   a substantially horizontal annular ring extending inwardly from the chamber substantially annular vertical wall to an inner edge having a radius $R_i$, said ring being spaced above said chamber bottom surface and extending around and attached to the entirety of the chamber substantially annular vertical wall;
   an enclosed influent channel through an opening in said chamber substantially annular vertical wall beneath said ring, said influent channel having
      one influent outer side wall substantially tangential to said chamber substantially annular vertical wall at said influent channel opening in said chamber substantially annular vertical wall, and an influent inner side wall having
   a substantially flat portion parallel to said one influent side wall, and
   a curved portion having said radius $R_i$ and extending from said influent inner side wall flat portion to an end spaced from said influent inner side wall flat portion, said curved portion being secured continuously along its entirety to the chamber bottom surface along said curved portion bottom and the ring along said curved portion top, said influent inner side wall curved portion extending through an arc of at least about 90 degrees, said enclosed influent channel having an outlet at an end of the influent inner side wall curved portion.

7. The grit removal unit of claim 6, wherein said inner side wall is a J-shaped baffle having a leg defining said influent inner side wall substantially flat portion and a curved portion defining said influent inner side wall curved portion and extending at least about 90 degrees and concentric with said chamber substantially annular vertical wall, with said J-shaped baffle curved portion secured to the inner edge of said ring.

8. The grit removal unit of claim 7, wherein said J-shaped baffle curved portion spirals from a proximate end adjacent said J-shaped baffle leg to a distal end spaced from said J-shaped baffle leg, said spiral of said J-shaped baffle curved portion having a radius at said distal end which is less than the radius at the proximate end.

9. The grit removal unit of claim 6, wherein said enclosed influent channel inner side wall curved portion extends through an arc of between about 90 degrees to about 270 degrees within the chamber substantially annular vertical wall.

10. The grit removal unit of claim 6, further comprising an effluent opening through said removal chamber substantially annular vertical wall and above said ring, wherein said influent channel outlet is located sufficiently around said removal chamber to substantially prevent influent from said influent channel outlet exiting to said effluent channel input without first entirely circling said chamber.

* * * * *